March 21, 1939. E. J. HOUDRY 2,150,923
METHOD OF CATALYSIS
Filed April 18, 1935
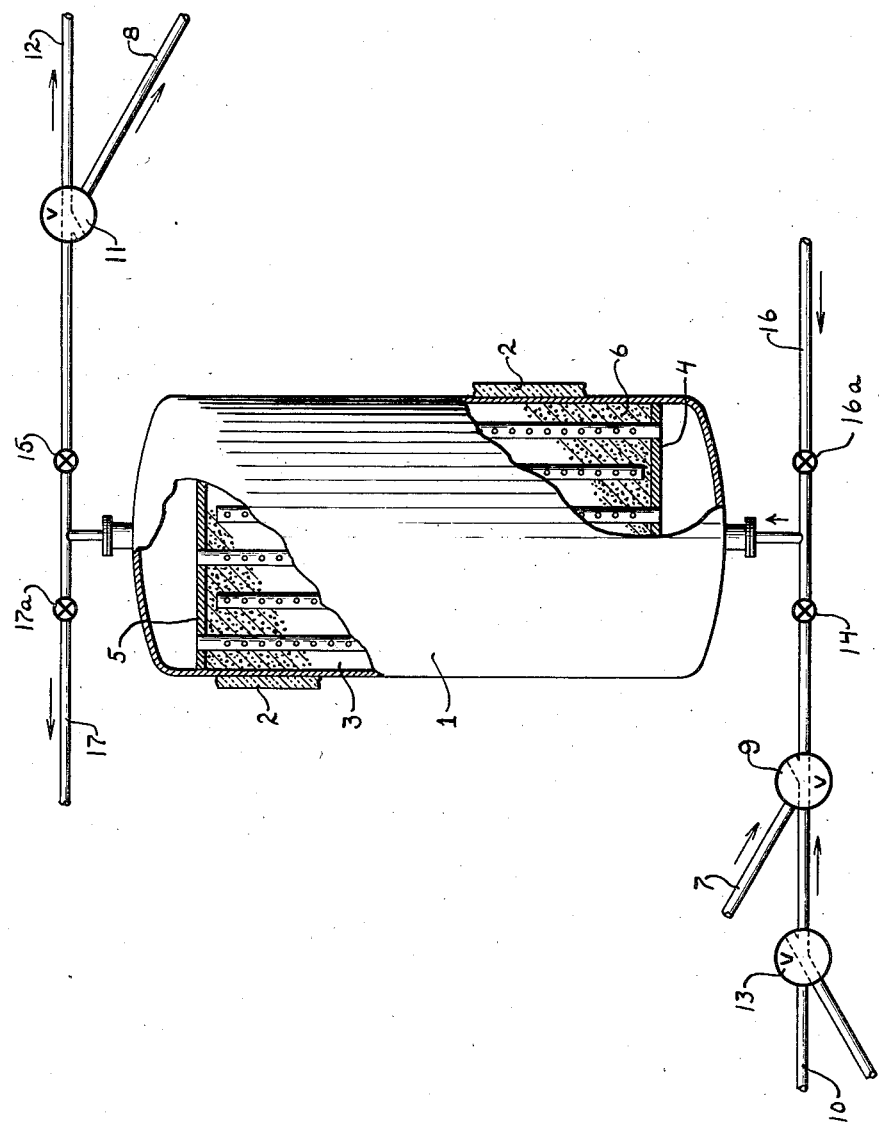
INVENTOR
Eugene J. Houdry
BY
Ira L. Nickerson
ATTORNEY Patented Mar. 21, 1939

2,150,923

UNITED STATES PATENT OFFICE 2,150,923

METHOD OF CATALYSIS

Eugene J. Houdry, Philadelphia, Pa., assignor to Houdry Process Corporation, Dover, Del., a corporation of Delaware Application April 18, 1935, Serial No. 17,136

3 Claims. (Cl. 196—52)

This invention relates to the use of adsorptive catalysts in the synthesis, the transformation, the decomposition or other treatment of substances in a gaseous condition, and is a continuation in part of my copending application Serial No. 512,301, filed in the United States Patent Office on January 30, 1931, under the name of Eugene Houdry.

Various metals, in a highly divided state, and compounds such as silicates and oxides are known to have the power of promoting reactions in or between gases, through their adsorptive catalytic action, and practical use of this power has been made in certain manufacturing operations such, for example, as the manufacture of sulphuric acid. In other fields of manufacture, however, notably in the conversion and refining of mineral oils, the use of a contact mass or catalyst for operation upon materials in gaseous phase has not had the degree of commercial success hoped for, notwithstanding the known fact that catalysts are capable of promoting the desired reactions upon materials in liquid phase, under conditions of high temperature and pressure.

It has been realized, theoretically, that catalysts of highly adsorbent character should be capable of promoting similar reactions under conditions of relatively low temperature and pressure, and this mode of operation is highly desirable for technical reasons which will be obvious. When attempts in this direction have been made, however, it has often been found, upon feeding the material to the contact or catalytic mass, that little, if any, of the desired product emerged from the mass. In some cases, such as the conversion of higher boiling hydrocarbons by the action of adsorptive catalytic masses, a certain measure of success has been attained, but the period of production has been so short or so entirely lacking that real commercial success has not been satisfactorily achieved.

I have discovered that the failure, in many such cases, has not been due, as heretofore supposed, to the failure of the catalyst or contact mass to produce the desired reaction, but to the fact that the product, although actually produced in such mass, in such cases, remains adsorbed therein, being displaced either with difficulty, or not at all, by the incoming raw material. The problem, therefore, is not so much the discovery of a suitable mass or catalyst, as the provision of means for expelling the product from the mass to make way for fresh material.

I have discovered, further, that the absorbed product may be expelled from the adsorbent contact mass or catalyst by the use of some material, in gaseous form, for which the mass has a stronger affinity than it has for the products of the desired reaction. Such material may be chemically inactive with respect to the material treated by the catalyst, as it has no essential part in the process and serves merely as a purgative for the catalyst. The purgative agent may likewise, according to the disclosure of my aforesaid copending application, be chemically inert to the adsorbent catalyst, and this aspect of my original disclosure is presented in my copending application Serial No. 17,137, filed of even date herewith, which is a continuation in part of application Serial No. 512,301. The invention herein disclosed relates to the use of a purgative which acts by reason of chemical or other affinity for the material of the catalyst and which releases the converted or adsorbed material by becoming associated with or joining or chemically combining with the catalytic or contact material and so changing the interfacial surface properties or physical condition of the latter as to destroy its capacity for adsorbing the converted material.

In brief, the present application is drawn to a process of catalysis or contacting wherein the adsorptivity of the contact mass is destroyed or substantially diminished by effecting a chemical change in the mass, or in minute particles thereof, and then restoring it to its original form, intermittently or continuously, whereas my copending application, Serial No. 17,137, is drawn to a process of catalysis or contacting wherein the effective adsorptive affinity of the contact mass for fluid reactants, relative to fluid products of reaction, is increased or enhanced, not by effecting a chemical change in the mass but by the use of a suitable relatively inert gaseous agent or purgative such as steam, for example, preferably intermittently.

As one illustration of the invention, reference may be had to the catalytic conversion of hydrocarbons in the form of mineral oils and their derivatives in the production of motor fuels and other products. It is known that nickel, copper, iron and certain other metals, deposited in finely divided metallic form in the pores of a natural or artificial ceramic body, are capable of producing useful transformations of hydrocarbons at moderate and low pressures and temperatures, as at pressures below 250 pounds per square inch and at temperatures between 500° and 900° F. and more preferably at temperatures between 600° or 675° and 900° F., but such catalysts, due to their high adsorbent capacity, do not readily release the converted products. In such a case the products may be discharged by sending into the catalytic mass a material, preferably in gaseous state, having a chemical affinity for some or all of the active ingredients in the mass. One such material is hydrogen sulphide which reacts with the catalytic metal to convert the same into a sulphide. This conversion almost completely destroys the adsorptive capacity of the metal of the type particularly contemplated so that the converted hydrocarbons are released. The sulphide of the catalytic mass may thereafter be reduced again to finely divided metal by feeding hydrogen to the catalyst. To accomplish this feasibly, it is desirable to employ only readily reducible metals, e. g. metals which can be readily reduced from the sulfide form to a lower degree of oxidation, such as metallic form. Difficultly reducible metals, such as molybdenum and tungsten, for example, or equivalent so-called sulfactive catalysts, would, of course, be unsuitable in a practical process of alternate oxidation (i. e. conversion to sulfide form) and reduction, as here described by way of illustration. Further, in the operation of my process where hydrogen sulfide is employed as the poisoning agent, it is essential that the contact mass in the sulfide form be substantially less adsorbent, and preferably entirely non-adsorbent toward the converted products. The ejecting agent may be used in either of two ways: it may be added to the hydrocarbon charge and fed simultaneously therewith to the catalytic mass for a continuous operation; or the feeding of the ejecting agent may alternate with that of the hydrocarbons for an intermittent operation.

For the continuous operation, hydrogen sulphide in an amount up to 10% by volume of the charge (dependent upon the quantity of active metal in the catalytic mass and on the operating conditions) is added to the vaporized hydrocarbon charge which is sent to the catalytic mass. The active metal may convert the heavy hydrocarbons into lighter hydrocarbons by reactions which are partly dehydrogenating in character releasing free hydrogen while retaining certain of the lighter hydrocarbons adsorbed in the mass. If no dehydrogenation takes place or if the hydrogen available is not sufficient for the subsequent reducing operation, hydrogen may be added to the charge, or may be produced by another reaction simultaneously with the transforming reaction. The hydrogen sulphide reacts with the active metal converting the same to a sulphide thus releasing the adsorbed hydrocarbons. The metallic sulphide is then reduced by the free hydrogen and restored to active state. Hence during the continuous operation the catalytic mass, or rather minute parts thereof, are continuously undergoing rapid changes as they alternate between active and poisoned condition.

In the intermittent operation of the process, the changes in the condition of the catalyst are made in well defined steps or stages. The hydrocarbon material alone is first fed in vapor phase to the catalyst in sufficient quantity to saturate the latter, the feed is stopped, the transformed products are then discharged by feeding into the catalytic mass a suitable quantity of the ejecting agent such as hydrogen sulphide to poison the active metals by converting them into sulphides, the feeding of hydrogen sulphide is stopped, and the metallic sulphides are then reduced again to the state of finely divided active metals by feeding hydrogen to the catalyst, thus restoring the activity of the catalyst so that the cycle of operations can be repeated. The intermittent method is used when the continuous method is not desired or when hydrogen in sufficient quantity is not available for the action described in connection with the continuous method.

Apparatus for practising the process may vary widely in form, but, in its essentials, is so simple as to make illustration unnecessary. It merely involves a converter with suitable connections for feeding thereto the material to be catalyzed, the ejecting agent which reacts chemically with the catalytic mass, and the reducing agent to restore the mass to its former activity; there will also be suitable outlet connections for removing the desired transformed product and the ejecting and reducing agents, together with suitable controls for all such connections. Suitable apparatus is shown in my copending application Serial No. 604,997, filed April 13, 1932 (Patent No. 2,073,638, issued March 16, 1937).

Illustrative of one specific type of apparatus for carrying out my invention, reference is made to the accompanying drawing, in which 1 is a casing or converter which may be insulated with any suitable material 2. Reaction chamber 3, within the converter, is bounded by lower partition member 4 and upper partition member 5 and contains a layer or body of contact or catalytic material 6. Reactants, e. g. hydrocarbons in the form of vaporous mineral oil, may be introduced through line 7 and valves 9 and 14 into the lower end of converter 1. The reactants then pass upwardly through the openings in the partition member 4 and through the perforated conduits which register therewith, to be distributed from the latter into the contact material 6, e. g. an adsorptive metal or metal oxide, such as nickel, copper, vanadium, etc., depending upon the specific character of the reactants and the type of reaction desired. Products of reaction leave the contact material 6 and enter the conduits joined to the upper partition member 5, and pass up through the latter. The fluid products then pass out of the converter and are drawn away through line 8.

As soon as the products or fluid substantially change in character or drop in quality, because of insufficient adsorption of reactants due to substantial adsorption of products of reaction, valve 9 may be turned or adjusted to permit fluid to pass therethrough from line 10. Such fluid may be of the type capable of changing material 6 to a chemically non-adsorptive form, e. g. hydrogen sulphide. The passage of this fluid is continued for a relatively short interval until the fluid leaving the top of the converter indicates that such fluid has completed its chemical change of the contact material 6 and hence has effected the release of adsorbed hydrocarbon products of reaction. If desired, valve 11 may be adjusted to lead away fluids through line 12 during all or a portion of this period.

Without changing valve 9, valve 13 may be adjusted to admit a different fluid, e. g. hydrogen, through the other branch line shown joined to valve 13. Passage of this fluid is continued only long enough chemically to reconvert the material 6 to adsorptive form and, with certain types of reactants, can even be dispensed with.

Next valve 9 is readjusted to admit reactants to converter 1 from line 7, and the cycle of operation is repeated.

After the repetition of this cycle of operation for a plurality of times (which may be 5, 100 or 1000, more or less, depending upon the nature of the reaction and the various factors involved), valves 14 and 15 may be closed and valves 16a and 17a opened to permit a regenerating medium, e. g. an oxygen-containing gas, to be introduced into the converter through line 16, while fumes or products of regeneration are withdrawn therefrom through line 17. This interruption of the production of desired hydrocarbon or other products is continued only long enough to remove undesirable deposits or contaminants from the contact material 6. Then valves 16a and 17a are closed and valves 14 and 15 again opened and repetition of the above-described cycle of operation again carried out.

Of course the various elements of apparatus shown are only illustrative and other apparatuses for carrying out a contact or catalytic process of the type herein described are likewise contemplated.

It will be understood that the invention is not limited in its essence to operations involving the conversion of hydrocarbons or to the use of the particular purging substance specifically referred to, but that it is susceptible of application, in principle, to catalytic operations involving a wide range of materials. Among the other substances which may be utilized in the same manner as hydrogen sulphide to react chemically with certain active metals to destroy their adsorptive capacity are hydrogen chloride and hydrogen bromide. Of course metals which react with these halogens to form adsorptive or catalytically active halides, such for example, as iron, aluminum and zinc, are excluded in the case where such halides are employed as the chemical agent for rendering the catalyst or contact mass non-adsorptive or relatively non-adsorptive.

I claim as my invention:

1. In the catalytic conversion of fluid reactants, the steps of process which comprise feeding the reactants under suitable temperature and pressure conditions and in a substantially vaporous or gaseous state to an adsorptive catalyst containing an active, readily reducible metal capable of effecting the desired conversion and possessing the characteristic of retaining vaporous or gaseous products of conversion adsorbed therein to the exclusion or substantial exclusion of the aforesaid reactants fed to said catalyst, said catalyst being maintained in a confined reaction zone, continuing the feeding of said reactants into said reaction zone for a period of time until said catalyst is saturated to substantial extent with adsorbed vaporous or gaseous products of reaction; temporarily stopping the feeding of said reactants to said zone and introducing into said zone a gaseous substance which is substantially inert to said reactants and is capable of chemically changing said metal into a sulphur compound of the metal which has a substantially diminished adsorptivity as compared with the aforesaid metal, thereby to release adsorbed vaporous or gaseous products of reaction from said catalyst; then stopping the feeding of said gaseous substance and introducing a reducing agent into said zone chemically to reconvert the chemically changed metal back to active, adsorptive condition; when said metal is again in active, adsorptive condition, again feeding the aforesaid reactants to be catalyzed to said reaction zone and in contact with the aforesaid catalyst, and repeating the above steps of process.

2. In the catalytic conversion of fluid hydrocarbons the process which comprises feeding the reactant hydrocarbons under suitable temperature and pressure conditions and in a substantially vaporous state to an adsorptive catalyst containing an active, readily reducible metal in finely divided form and capable of making the desired transformation, said catalyst being maintained in a confined reaction zone, continuing the feeding of reactant hydrocarbons into said reaction zone for a period of time until said catalyst is saturated to substantial extent with transformed vaporous product; temporarily stopping the feeding of said reactant hydrocarbons to said reaction zone and introducing into said zone a gaseous substance which is substantially inert to the hydrocarbons and is capable of chemically changing said metal into a sulphur compound of the metal which has a substantially diminished adsorptivity as compared with the aforesaid metal, thereby to release adsorbed hydrocarbon products from said catalyst; then stopping the feeding of said gaseous substance and introducing a reducing agent into said zone chemically to reconvert the chemically changed metal back to active, adsorptive condition; when said metal is again in active, adsorptive condition, again feeding hydrocarbons to be catalyzed to said reaction zone and in contact with the aforesaid catalyst, and repeating the above steps of process.

3. In the catalytic conversion of hydrocarbons, the process which comprises feeding the hydrocarbons to an adsorbent catalyst containing an active, readily reducible metal in finely divided form and capable of making the desired transformation, said metal having substantially no adsorptivity when in the form of a sulfide, continuing the feeding of hydrocarbons until the catalyst is substantially saturated with transformed products, stopping the feeding of the hydrocarbons, introducing a quantity of hydrogen sulfide sufficient to convert the metal to a sulfide, thereby to destroy adsorptivity of the metal and to release the converted fluid material from the catalyst, stopping the feed of hydrogen sulfide, then feeding hydrogen to the catalyst to reduce the sulfide again to finely divided metal, stopping the feeding of hydrogen when reduction is substantially complete, renewing the feeding of the hydrocarbons to be catalyzed, and repeating the above operations.

EUGENE J. HOUDRY.

CERTIFICATE OF CORRECTION.

Patent No. 2,150,923. March 21, 1939.

EUGENE J HOUDRY.

It is hereby certified that error appears in the printed specification of the above numbered patent requiring correction as follows: Page 1, first column, line 48, strike out the words and comma "in such cases," and insert the same before "is" in line 51; and that the said Letters Patent should be read with this correction therein that the same may conform to the record of the case in the Patent Office.

Signed and sealed this 2nd day of May, A. D. 1939.

Henry Van Arsdale (Seal)                      Acting Commissioner of Patents.